United States Patent [19]

Takai et al.

[11] Patent Number: 5,225,234

[45] Date of Patent: Jul. 6, 1993

[54] MAGNETIC RECORDING MEDIUM COMPRISING MULTIPLE THIN FILM MAGNETIC LAYERS EACH FORMED WITHIN SPECIFIED MAXIMUM AND MINIMUM INCIDENT ANGLES

[75] Inventors: Mitsuru Takai; Koji Kobayashi, both of Miyota, Japan

[73] Assignee: TDK Corporation, Tokyo, Japan

[21] Appl. No.: 694,913

[22] Filed: May 2, 1991

[30] Foreign Application Priority Data

May 10, 1990 [JP] Japan ................................. 2-120610

[51] Int. Cl.$^5$ ................................. G11B 5/00
[52] U.S. Cl. ................................. 428/336; 428/611; 428/694 TM; 428/900; 428/928; 428/668
[58] Field of Search ............... 428/611, 668, 694, 900, 428/928, 336

[56] References Cited

U.S. PATENT DOCUMENTS

| | | | |
|---|---|---|---|
| 4,387,136 | 6/1983 | Saito et al. | 428/328 |
| 4,520,076 | 5/1985 | Saito et al. | 428/611 |
| 4,548,871 | 10/1985 | Kobayashi et al. | 428/593 |
| 4,770,924 | 9/1988 | Takai et al. | 428/212 |
| 4,900,622 | 2/1990 | Nakayama et al. | 428/336 |

FOREIGN PATENT DOCUMENTS 2072406 9/1981 United Kingdom .

OTHER PUBLICATIONS

Patent Abstracts of Japan vol. 13, No. 256 (P-884) (3604), Jun. 14, 1989: & JP-A-1-53345 (Konica Corp) Jan. 3, 1989.
Patent Abstracts of Japan, vol. 14, No. 325 (P-1075), 12 Jul. 1990; & JP-A-2108219 (Matsushita Electric Ind Co Ltd.) 20 Apr. 1990.
Patent Abstracts of Japan vol. 12, No. 249 (P-370), 14 Jul. 1988; & JP-A-63039127 (TDK Corp) 19 Feb. 1988.
Patent Abstracts of Japan vol. 13, No. 508 (P-960), 15 Nov. 1989; & JP-A-1205717 (Matsushita Electric Ind Co Ltd.) 18 Aug. 1989.
Patent Abstracts of Japan vol. 13, No. 508 (P-960), 15 Nov. 1989; & JP-A-1205716 (Matsushita Electric Ind Co Ltd) 18 Aug. 1989.
Patent Abstracts of Japan vol. 6, No. 245 (P-159) 3 Dec. 1982: & JP-A-57-143730 (Fuji Shasin Film KK) 6 Sep. 1982.

*Primary Examiner*—Paul J. Thibodeau
*Assistant Examiner*—Stevan A. Resan
*Attorney, Agent, or Firm*—Oblon, Spivak, McClelland, Maier & Neustadt

[57] ABSTRACT

A magnetic recording medium of the longitudinal recording type is comprised of a magnetic layer on one major surface of a non-magnetic substrate wherein the magnetic layer consists of at least two layers of cobalt-based ferromagnetic metal thin film which are formed by oblique evaporation at an incident angle varying between a maximum $\theta$max and a minimum $\theta$min. Assuming that the layers disposed close to and remote from the substrate are designated lowermost and uppermost layers, respectively, the lowermost layer of ferromagnetic metal thin film is deposited at a smaller $\theta$max value than is the uppermost layer of ferromagnetic metal thin film. The uppermost layer is deposited at a greater $\theta$min value than is the lowermost layer. The medium is improved in corrosion resistance and electromagnetic properties properties.

12 Claims, No Drawings

MAGNETIC RECORDING MEDIUM COMPRISING MULTIPLE THIN FILM MAGNETIC LAYERS EACH FORMED WITHIN SPECIFIED MAXIMUM AND MINIMUM INCIDENT ANGLES

This invention relates to a magnetic recording medium, and more particularly, to a magnetic recording medium of the longitudinal recording type having at least two layers of cobalt-based ferromagnetic metal thin film evaporated on a non-magnetic substrate.

BACKGROUND OF THE INVENTION

Advanced magnetic recording media are required to have increased recording density. Among others, research work has been focused on magnetic recording media using ferromagnetic metal thin films based on cobalt with nickel or similar elements added since they have high saturation magnetic flux density and high coercive force.

Magnetic recording media of this type are fabricated by various methods including oblique evaporation also known as deposition method of continuously varied incidence. One preferred mode of oblique evaporation is by depositing two or more layers of ferromagnetic metal thin film on a non-magnetic substrate to form a multi-layer structure thereon. In the oblique evaporation method, each layer of ferromagnetic metal thin film is prepared by furnishing vapor of ferromagnetic metal by a vapor phase method such as evaporation, and directing the ferromagnetic metal vapor toward the non-magnetic substrate surface at a certain angle. A second or upper layer is obtained by growing columnar grains of ferromagnetic metal in a direction transverse to the direction of growth of columnar grains of ferromagnetic metal of an underlying layer. Reference is made to the following publications.

| Japanese Patent Publication (JP-B) Nos. | | |
|---|---|---|
| 26891/1981 | 42055/1981 | 37528/1985 |
| 21254/1988 | | |
| Japanese Patent Application Kokai (JP-A) Nos. | | |
| 603/1979 | 147010/1979 | 94520/1981 |
| 3233/1982 | 30228/1982 | 13519/1982 |
| 141027/1982 | 41028/1982 | 141029/1982 |
| 143730/1982 | 143731/1982 | 147129/1982 |
| 14324/1983 | 50628/1983 | 76025/1985 |
| 110333/1986 | 187122/1986 | 10315/1988 |
| 13117/1988 | 14317/1988 | 14320/1988 |
| 39127/1988 | | |

The multi-layer structure improves coercive force and other electromagnetic properties as well as mechanical properties. There is a demand for further improvement.

Regarding magnetic recording media of the longitudinal recording type, the inventors found that there was left a room for improvement in electromagnetic properties and durability, because the directions of growth of columnar grains in ferromagnetic metal thin films and their correlation and the thicknesses of such films and their correlation were not fully studied.

One approach to these problems was proposed in JP-A 9015/1988 by the applicant, which is directed to a magnetic recording medium comprising two layers of Co-Ni base ferromagnetic metal thin film wherein the direction of growth of columnar grains of the upper layer intersects that of the lower layer. By a choice of thickness such that the upper layer was thinner than the lower layer, electromagnetic properties and durability were improved as well as dynamic properties. In fact, improvements in durability and dynamic properties were satisfactory, but there was a room for further improvement in electromagnetic properties.

Regarding magnetic recording medium of the same two layer type, the applicant attempted in JP-A 10314/1988 to improve electromagnetic properties and durability by adjusting the minimum incident angle. The minimum incident angle is the angle defined between the direction of incidence of metal particles in a final evaporation stage of each ferromagnetic metal thin film and a normal to the non-magnetic substrate. However, durability, especially under high-temperature, high-humidity condition and electromagnetic properties were still unsatisfactory because of a relatively greater minimum incident angle for the upper layer and because of the two layer arrangement.

Magnetic recording media having three or more layers of ferromagnetic metal thin film formed by oblique evaporation are also known. One as disclosed in JP-A 134317/1981 was unsatisfactory in electromagnetic properties or temperature and humidity resistance because the thickness correlation among the respective ferromagnetic metal thin film layers was not contemplated and the incident angle of metal particles was greater. JP-A 60205/1978 discloses a similar medium which was less resistant against corrosion because the respective layers had an approximately equal thickness of 500 to 700 Å and an incident angle of ferromagnetic metal as great as 22 to 72 degrees. Moreover, in JP-A 39127/1988 and 10315/1988, the ferromagnetic metal thin film of the uppermost layer was oxidized into oxide to enhance durability, but at the sacrifice of electromagnetic properties due to the same oxide.

SUMMARY OF THE INVENTION

Therefore, an object of the present invention is to provide a novel and improved magnetic recording medium having multiple layers of obliquely evaporated ferromagnetic metal thin film which has overcome the above-mentioned drawbacks of the prior art and meets the requirements of electromagnetic properties and durability under high-temperature, high-humidity condition at the same time.

The above and other objects are achieved by providing a magnetic recording medium comprising a magnetic layer on one major surface of a non-magnetic substrate wherein the magnetic layer consists essentially of at least two layers of cobalt-based ferromagnetic metal thin film which are formed by oblique evaporation at an incident angle varying between a maximum $\theta$max and a minimum $\theta$min. Assume that the layers of ferromagnetic metal thin film disposed close to and remote from the substrate are lowermost and uppermost layers, respectively. In a first embodiment, the lowermost layer of ferromagnetic metal thin film is deposited at a smaller $\theta$max value than is the uppermost layer of ferromagnetic metal thin film.

In a second embodiment, the uppermost layer of ferromagnetic metal thin film is deposited at a greater $\theta$min value than is the lowermost layer of ferromagnetic metal thin film. Combination of the requirements of the first and second embodiments is also contemplated.

Preferably, the sum of $\theta$max and $\theta$min associated with deposition of ferromagnetic metal for the uppermost layer is greater than that for the lowermost layer.

The two layers are deposited such that directions of incidence of ferromagnetic metal may intersect each other on opposite sides of a normal to the substrate surface. The minimum incident angle θmin has a value of 20 to 60 degrees and 10 to 50 degrees during deposition of the uppermost and lowermost layers, respectively. The maximum incident angle θmax has a value of 80 to 90 degrees and 31 to 89 degrees during deposition of the uppermost and lowermost layers, respectively.

In the manufacture of magnetic recording medium using an oblique evaporation technique, a ferromagnetic metal thin film is deposited on a non-magnetic substrate by irradiating an electron beam or supplying energy to a ferromagnetic metal source to evaporate the metal while causing a cylindrical chill drum to rotate to carry on its surface the non-magnetic substrate. The angle defined between the direction of incidence of ferromagnetic metal and a normal to the substrate surface is generally known as an incident angle. In most practice, evaporation is effected such that the incident angle may gradually decrease from the start to the end. Therefore, columnar grains or crystals in a ferromagnetic metal thin film deposited on a non-magnetic substrate are oriented approximately parallel to the substrate surface on the side adjacent to the substrate, but grow in an arcuate manner as they are spaced apart from the substrate. The maximum and minimum of the incident angle during evaporation are generally known as a maximum incident angle θmax and a minimum incident angle θmin, respectively. It is to be noted that θmax is up to 90 degrees and deposition efficiency increases as the incident angle varies from θmax to θmin.

In magnetic recording medium of the longitudinal recording type in which the magnetic layer is magnetizable in a direction parallel to the surface, θmax is set equal to 90 degrees. This is because the average gradient of columnar grains relative to the substrate surface is reduced with a greater θmax, whereby the ferromagnetic metal thin film has an increased coercive force Hc in the direction parallel to the surface.

In the first embodiment of the present invention, the lowermost layer, that is, the ferromagnetic metal thin film located close to the substrate is deposited at a smaller θmax value than the θmax used for the uppermost layer, that is, the ferromagnetic metal thin film located remote from the substrate. This indicates that the lowermost layer is deposited at a θmax of smaller than 90 degrees. The reason is described below.

In general, non-magnetic substrates contain oxygen and moisture which can migrate from the substrate surface to the overlying ferromagnetic metal thin film. Thus the ferromagnetic metal thin film tends to undergo corrosion from the substrate side. A study showed that at θmax of nearly 90 degrees, that is, in a portion of ferromagnetic metal which has deposited on the substrate surface in a direction nearly parallel thereto, columnar grains have a smaller diameter due to low deposition efficiency, leaving gaps between grains through which oxygen and water can penetrate from within the substrate to promote corrosion. We have found that gap formation can be minimized by depositing the lowermost layer at θmax of smaller than 90 degrees, thereby providing a magnetic recording medium having improved corrosion resistance. A reduction of gaps leads to an increase in packing density of ferromagnetic metal, which in turn, leads to higher saturation magnetization.

In normal video recording as prescribed by the Hi-8 standard, low band signals (color signals of 0.75 MHz) and high band signals (luminance signals of 7.0 MHz) are recorded in an overlapping manner. The magnetic recording medium of the present invention having at least two layers of ferromagnetic metal thin film deposited by evaporation is designed such that low band signals are mainly recorded in the lowermost layer. The lowermost layer will have lower Hc due to deposition at a smaller θmax, but exhibit rather advantageous electromagnetic properties for recording low band signals. The uppermost layer on the other hand has an increased Hc and adequate electromagnetic properties for recording high band signals since the θmax during evaporation of the uppermost layer is greater than the θmax during evaporation of the lowermost layer. Consequently, the medium as a whole has improved electromagnetic properties over the entire band while insuring high corrosion resistance.

In the second embodiment of the invention, the uppermost layer of ferromagnetic metal thin film is deposited at a greater θmin value than the θmin used for the deposition of the lowermost layer of ferromagnetic metal thin film.

The minimum incident angle θmin is also correlated to the slope of columnar grains such that with a greater value of θmin, the average gradient of columnar grains is smaller and Hc is increased. With a smaller value of θmin, in turn, the average gradient of columnar grains is greater and the majority of columnar grains are deposited at higher efficiency so that the grains become more uniform in diameter and are packed with less gaps therebetween, yielding a denser film. Then, the minimum incident angle control of the second embodiment allows the uppermost layer to have higher Hc and the lowermost layer to have relatively low Hc. The magnetic layer as a whole is improved in electromagnetic properties and the lowermost layer is improved in corrosion resistance. Electromagnetic properties and corrosion resistance are further improved by additionally controlling the θmax values associated with evaporation of the lowermost and uppermost layers as in the first embodiment.

In either of the first and second embodiments, electromagnetic properties and corrosion resistance are further improved when the sum of θmax and θmin associated with deposition of ferromagnetic metal for the uppermost layer is greater than the sum of θmax and θmin associated with deposition of ferromagnetic metal for the lowermost layer.

DETAILED DESCRIPTION OF THE INVENTION

The construction of the magnetic recording medium according to the present invention will be described in further detail. The magnetic recording medium is comprised of a non-magnetic substrate and a magnetic layer deposited on one major surface of the substrate.

The non-magnetic substrate is of any desired material. Strips or films of resins capable of withstanding the heat generated during evaporation of ferromagnetic metal, for example, polyethylene terephthalate are used. Other useful materials are disclosed in JP-A 10315/1988.

On the substrate is formed a magnetic layer which consists essentially of at least two layers of cobalt-based ferromagnetic metal thin film all formed by oblique evaporation. Among the at least two layers, the layers disposed close to and remote from the substrate are herein designated lowermost and uppermost layers, respectively.

According to the first embodiment of the invention, the $\theta$max associated with the lowermost layer of ferromagnetic metal thin film is smaller than the $\theta$max associated with the uppermost layer of ferromagnetic metal thin film. As a result, both corrosion resistance and electromagnetic properties are improved.

Preferably, deposition of the uppermost layer uses a maximum incident angle $\theta$max of 80 to 90 degrees, especially 85 to 90 degrees and deposition of the lowermost layer uses a maximum incident angle $\theta$max of 31 to 89 degrees, especially 60 to 84 degrees.

According to the second embodiment of the invention, the $\theta$min associated with the uppermost layer of ferromagnetic metal thin film is greater than the $\theta$min associated with the lowermost layer of ferromagnetic metal thin film. As a result, both corrosion resistance and electromagnetic properties are improved.

Preferably, deposition of the uppermost layer uses a minimum incident angle $\theta$min of 20 to 60 degrees, especially 31 to 60 degrees and deposition of the lowermost layer uses a minimum incident angle $\theta$min of 10 to 50 degrees, especially 10 to 30 degrees.

Better results are obtained when the requirements of the first and second embodiments are fulfilled at the same time.

In either or both of the first and second embodiments, the sum of $\theta$max and $\theta$min associated with deposition of ferromagnetic metal for the uppermost layer is preferably greater than the sum of $\theta$max and $\theta$min associated with deposition of ferromagnetic metal for the lowermost layer. The sum of $\theta$max and $\theta$min associated with the uppermost layer desirably ranges from 100 to 150 degrees, especially from 116 to 150 degrees while the sum of $\theta$max and $\theta$min associated with the lowermost layer desirably ranges from 41 to 139 degrees, especially from 70 to 114 degrees.

Also preferably, two layers of ferromagnetic metal thin film are deposited such that the direction of incidence of ferromagnetic metal of one layer on one side of a normal to the substrate surface may intersect the direction of incidence of ferromagnetic metal of the other layer on the opposite side of the normal. Differently stated, the growth directions of ferromagnetic metal columnar grains in the two layers intersect each other on opposite sides of the normal to the substrate surface.

This intersecting grain orientation can be achieved by reversing the travel direction of the non-magnetic substrate, that is, by effecting oblique evaporation of one layer while moving the substrate in one direction and then effecting oblique evaporation of another layer while moving the substrate in the opposite direction.

When three or more layers are included, the two layers which fulfill the incidence direction intersection arrangement may be the uppermost layer and an adjacent layer or the uppermost layer and a layer disposed adjacent the uppermost layer via one layer.

With this arrangement, the uppermost layer and the first or second next layer are adapted to have adequate Hc values for high and low band signal recording so that the magnetic layer has improved electromagnetic properties over the entire band range.

The number of ferromagnetic metal thin film layers is not critical. An arrangement of two, three, four or more layers may be chosen for a particular purpose. In the case of a multi-layer arrangement having three or more layers, an intermediate layer which intervenes between the uppermost and lowermost layers may be formed by selecting evaporation or deposition parameters like $\theta$max, $\theta$min, thickness and columnar grain growth direction in consideration of the recording signal band and the thickness of the remaining layers so that the intermediate layer may have optimum Hc and corrosion resistance. Where low and high band signals are recorded in an overlapping manner as in the Hi-8 standard video recording, the deposition parameters may be determined by taking into account the recording signal bands assigned to the respective layers.

The ferromagnetic metal thin films constituting the magnetic layer are of cobalt base metal materials, preferably cobalt-nickel alloys, most preferably cobalt-nickel alloy consisting of about 80 mol % of Co and about 20 mol % of Ni. Inclusion of up to 10 mol % of Cr is acceptable. The cobalt base metal materials may further contain additional metals as disclosed in JP-A 10315/1988. If desired, a minor amount of oxygen can be incorporated in a sub-surface layer for improving corrosion resistance.

Each ferromagnetic metal thin film or layer may have a thickness of about 400 to 1200 Å. If the uppermost layer has a thickness of less than 400 Å, high band signals of about 7.0 MHz would be recorded to a less extent with an attendant loss of output. More noises might occur with a thickness of more than 1200 Å, resulting in low S/N. The magnetic layer as a whole preferably has a thickness of at least 2000 Å because a sufficient output is available in a low band of about 0.75 MHz. For obtaining high outputs in both low and high bands, the layer thickness is increased from the uppermost layer to the underlying layers.

All the ferromagnetic metal thin films are formed by oblique evaporation. The apparatus and method for oblique evaporation are set forth in the literature as well as the patent publications previously cited, and any desired one may be employed herein.

Briefly stated, oblique evaporation is carried out by feeding a length of film-shaped non-magnetic substrate unraveled from a supply roll in contact with the surface of a rotating chill drum, irradiating an electron beam or supplying energy to at least one ferromagnetic metal source to evaporate the metal, depositing the metal on the exposed surface of the moving substrate, and taking up the length of substrate on a take-up roll. The incident angle continuously varies from $\theta$max at the start of deposition to $\theta$min at the end of deposition while columnar grains of cobalt base ferromagnetic metal are grown in an arcuate and close alignment on the substrate surface. When more than one layer is formed, the procedure is repeated. When it is desired to deposit two layers of ferromagnetic metal thin film such that the directions of incidence of ferromagnetic metal may intersect each other from opposite sides of a normal to the substrate surface, the travel direction of the substrate during deposition of the second layer is reversed from that for the first layer.

On the magnetic layer of the magnetic recording medium according to the present invention, any desired conventional topcoat layer may be provided for the purposes of magnetic layer protection and corrosion resistance improvement. Also, the medium may be provided on the surface opposite to the magnetic layer with any desired conventional backcoat layer for insuring smooth travel to the medium in tape form.

The magnetic recording media according to the present invention are useful in various modes of magnetic recording requiring high density recording, especially in such video recording mode as required by the Hi-8 standard where high and low band signals are recorded in an overlapping manner.

EXAMPLE

Examples of the present invention are given below by way of illustration and not by way of limitation.

EXAMPLE 1

Oblique evaporation was carried out in an argon atmosphere of $10^{-4}$ Torr by unravelling a length of polyethylene terephthalate (PET) film of 7 μm thick from a supply roll, transferring it along the peripheral surface of a rotating cylindrical chill drum, evaporating 20 at % Ni-Co alloy to deposit a lower layer of ferromagnetic metal thin film, and then taking up the coated PET film on a take-up roll.

Next, oblique evaporation was repeated in the same manner as above, but using the resulting take-up roll as a supply roll, thereby depositing an upper layer of ferromagnetic metal thin film on the lower layer such that the ferromagnetic metal of the upper layer was deposited in an incident direction which intersected the incident direction of the lower layer on opposite sides of a normal to the PET film surface. There was obtained a magnetic recording medium having a magnetic layer of the two layer structure.

A series of magnetic recording medium samples were prepared by varying the minimum and maximum incident angles $\theta$min and $\theta$max during evaporation of the lower and upper layers as reported in Table 1. For all the samples, the lower layer had a thickness of 1100 Å and the upper layer had a thickness of 900 Å.

Hi-8 standard video cassettes were manufactured from the samples by slitting the samples to a width of 8 mm. The tape samples were examined by the following tests.

(1) Rust

After storage for 1 week in an environment of 60° C. and RH 90%, a tape sample on the magnetic layer side was visually observed for degree of discoloration. Evaluation was made according to the following criterion.

⊚: no change
○: turned pale yellow
Δ: turned yellow
X: turned blue (2) Cupping

After storage for 1 week in an environment of 60° C. and RH 90%, a tape sample was rested on a plane to measure the curling height h of one transverse tape edge. Evaluation was made according to the following criterion.

⊚: $|h|=0$
○: $0<|h|\leq 0.2$ mm
Δ: $0.2$ mm $<|h|\leq 0.5$ mm
X: $0.5$ mm $\leq |h|$ The cupping is a measure representing the degree of deformation of the tape in its transverse direction. Greater cupping would lead to greater output variations because it would become difficult to keep the spacing between the tape and the magnetic head constant.

(3) Electromagnetic Property (at 7 MHz)

Using a VCR deck Sony EV-S900 according to the Hi-8 standard, a single signal of 7 MHz was recorded and reproduced to measure an RF output which was compared with the RF output of a reference tape. Evaluation was made according to the following criterion.

⊚: Δ(RF output)$\leq 2.0$ dB
○: $0$ dB$\leq$Δ(RF output)$<2.0$ dB
Δ: $-1.0$ dB$\leq$Δ(RF output)$<0$ dB
X: Δ(RF output)$<-1.0$ dB Upon measurement, the relative movement of the magnetic head assumed the direction that the growth direction of columnar grains of the upper layer was projected on the PET film surface.

(4) ΔBm

A tape sample was measured for maximum magnetization Bm both before and after storage for 1 week in an environment of 60° C. and RH 90%, to determine an increase ΔBm from the initial value.

(5) Dropout Variation with Time

The number of dropouts was counted both before and after storage for 1 week in an environment of 50° C. and RH 80%, to determine an increase ΔDO from the initial value. An output drop of 16 dB or more for a duration of 15 μsec. or longer was regarded a dropout.

(6) Dynamic Friction Variation with Time

A tape sample was measured for coefficient of dynamic friction μ both before and after storage for 1 week in an environment of 50° C. and RH 80%, to determine an increase Δμ from the initial value.

TABLE 1

| Sample No. | Upper layer $\theta$min (°) | Upper layer $\theta$max (°) | Upper layer $\theta$min + $\theta$max (°) | Lower layer $\theta$min (°) | Lower layer $\theta$max (°) | Lower layer $\theta$min + $\theta$max (°) | Rust | Cupping | Output @ 7 MHz | ΔBm (%) | ΔDO (%) | Δμ (%) |
|---|---|---|---|---|---|---|---|---|---|---|---|---|
| 101* | 30 | 90 | 120 | 30 | 90 | 120 | Δ | Δ | Δ | −20 | +100 | +80 |
| 1 | 30 | 90 | 120 | 30 | 70 | 100 | ⊚ | ⊚ | Δ | −5 | +25 | +20 |
| 2 | 50 | 90 | 140 | 30 | 90 | 120 | Δ | Δ | ⊚ | −20 | +100 | +80 |
| 3 | 50 | 90 | 140 | 30 | 70 | 100 | ⊚ | ○ | ⊚ | −5 | +25 | +20 |
| 102* | 50 | 90 | 140 | 50 | 90 | 140 | X | X | ⊚ | −25 | +150 | +150 |
| 103* | 30 | 90 | 120 | 50 | 90 | 140 | X | X | Δ | −20 | +100 | +95 |
| 104* | 30 | 70 | 100 | 30 | 90 | 120 | ○ | ○ | X | −10 | +30 | +30 |
| 105* | 30 | 70 | 100 | 30 | 70 | 100 | ⊚ | ⊚ | X | −3 | +20 | +10 |

*Comparison

Sample Nos. 1 to 3 were within the scope of the invention while sample Nos. 101, 102 and 105 were comparative samples in which lower and upper layers were formed under identical conditions. The benefits of the present invention are evident from the data of Table 1.

Sample No. 1 having the lower layer $\theta$max set smaller than the upper layer $\theta$max showed markedly improved corrosion resistance as compared with sample No. 101 having the same incident angles as sample No. 1 except Δ: −1.0 dB ≦ Δ(RF output) < 0 dB
X: Δ(RF output) < −1.0 dB

TABLE 2

| Sample No. | Upper layer | | | Intermediate layer | | | Lower layer | | |
|---|---|---|---|---|---|---|---|---|---|
| | $\theta$min (°) | $\theta$max (°) | $\theta$min + $\theta$max (°) | $\theta$min (°) | $\theta$max (°) | $\theta$min + $\theta$max (°) | $\theta$min (°) | $\theta$max (°) | $\theta$min + $\theta$max (°) |
| 111* | 30 | 90 | 120 | 30 | 90 | 120 | 30 | 90 | 120 |
| 11 | 30 | 90 | 120 | 30 | 90 | 120 | 30 | 70 | 100 |
| 12 | 50 | 90 | 140 | 30 | 90 | 120 | 30 | 90 | 120 |
| 13 | 50 | 90 | 140 | 30 | 90 | 120 | 30 | 70 | 100 |
| 111* | 50 | 90 | 140 | 30 | 90 | 120 | 50 | 90 | 140 |
| 113* | 30 | 90 | 120 | 30 | 90 | 120 | 50 | 90 | 140 |
| 114* | 30 | 70 | 100 | 30 | 90 | 120 | 30 | 90 | 120 |
| 115* | 30 | 70 | 100 | 30 | 90 | 120 | 30 | 70 | 100 |
| 14 | 50 | 90 | 140 | 30 | 90 | 120 | 30 | 70 | 100 |

| Sample No. | Deposition direction | | | Rust | Cupping | Output | | ΔBm (%) | ΔDO (%) | Δμ (%) |
|---|---|---|---|---|---|---|---|---|---|---|
| | Upper | Int. | Lower | | | @0.75 MHz | @7 MHz | | | |
| 111* | + | + | − | Δ | Δ | Δ | Δ | −20 | +100 | +80 |
| 11 | + | + | − | ⊙ | ⊙ | ⊙ | Δ | −5 | +25 | +20 |
| 12 | + | + | − | Δ | Δ | Δ | ⊙ | −20 | +100 | +80 |
| 13 | + | + | − | ⊙ | ○ | ⊙ | ⊙ | −5 | +25 | +20 |
| 111* | + | + | − | X | X | Δ | ⊙ | −25 | +150 | +150 |
| 113* | + | + | − | X | X | X | Δ | −20 | +100 | +95 |
| 114* | + | + | − | ○ | ○ | Δ | X | −10 | +30 | +30 |
| 115* | + | + | − | ⊙ | ⊙ | ⊙ | X | −3 | +20 | +10 |
| 14 | + | − | + | ⊙ | ○ | ⊙ | ○ | −5 | +25 | +20 |

*Comparison the lower layer $\theta$max and markedly improved electromagnetic properties as compared with sample No. 105 having the same incident angles as sample No. 1 except the upper layer $\theta$max.

Sample No. 2 having the upper layer $\theta$min set greater than the lower layer $\theta$min showed markedly improved electromagnetic properties as compared with sample No. 101 having the same incident angles as sample No. 1 except the upper layer $\theta$min and markedly improved corrosion resistance as compared with sample No. 102 having the same incident angles as sample No. 1 except the lower layer $\theta$min.

Sample No. 3 meeting both the requirements of sample Nos. 1 and 2 was excellent in both corrosion resistance and electromagnetic properties.

EXAMPLE 2

Magnetic recording medium samples were prepared according to the procedure of Example 1 except that the magnetic layer consisted of three layers of ferromagnetic metal thin film as reported in Table 2. The lower, intermediate and upper layers each had a thickness of 700 Å.

In Table 2, the deposition direction of the respective layers that corresponds to the growth direction of columnar grains is labeled + or − when said direction as projected on the tape surface is coincident with or opposite to the relative movement direction of the magnetic head relative to the tape, respectively.

The samples were examined by the same tests as in Example 1, with the results shown in Table 2. An additional test is the following one.

(7) Electromagnetic Property (at 0.75 MHz)

Using a VCR deck Sony EV-S900 according to the Hi-8 standard, a single signal of 0.75 MHz was recorded and reproduced to measure an RF output which was compared with the RF output of a reference tape. Evaluation was made according to the following criterion.

⊙: Δ(RF output) ≦ 2.0 dB
○: 0 dB ≦ Δ(RF output) < 2.0 dB

The benefits of the present invention are evident from the data of Table 2. Magnetic layers of three layer structure are also improved in corrosion resistance by depositing the respective layers according to the teaching of the present invention. Electromagnetic properties are substantially improved in both low and high bands.

There has been described a magnetic recording medium which is markedly resistant against corrosion. This magnetic recording medium experiences least variation of electromagnetic properties with time and least cupping which leads to least variation with time of the spacing between the medium and the magnetic head. Also minimized are variations with time of dropout and dynamic transfer in tape form. Therefore, the medium is durable and reliable. In addition, the medium has desirable electromagnetic properties over the necessary frequency range covering from low to high band signals and is adapted for wider frequency range recording.

Although some preferred embodiments have been described, many modifications and variations may be made thereto in the light of the above teachings. It is therefore to be understood that within the scope of the appended claims, the invention may be practiced otherwise than as specifically described.

We claim:

1. A magnetic recording medium comprising a composite magnetic layer on one major surface of a nonmagnetic substrate wherein said composite magnetic layer consists essentially of at least two layers of cobalt-based ferromagnetic metal thin film which are formed by oblique evaporation at an incident angle varying between a maximum $\theta$max and a minimum $\theta$min, the layers disposed close to and remote from the substrate are designated lowermost and uppermost layers, respectively, wherein the lowermost layer of ferromagnetic metal thin film is deposited at a smaller $\theta$max value than is the uppermost layer of ferromagnetic metal thin film, and the uppermost layer of ferromagnetic metal thin film is deposited at a greater $\theta$min value than is the lowermost layer of ferromagnetic metal thin film, and the sum of θmax and θmin associated with deposition of ferromagnetic metal for the uppermost layer is greater than that of the lowermost layer, and the minimum incident angle θmin has a value of 20 to 60 degrees and 10 to 50 degrees during deposition of the uppermost and lowermost layers, respectively, and the maximum incident angle θmax has a value of 80 to 90 degrees and 31 to 89 degrees during deposition of the uppermost and lowermost layers, respectively.

2. The magnetic recording medium of claim 1 wherein said at least two layers are deposited such that directions of incidence of ferromagnetic metal may intersect each other on opposite sides of a normal to the substrate surface.

3. A magnetic recording medium according to claim 1, wherein the maximum incident angle θmax has a value of 85 to 90 degrees during deposition of the uppermost layer.

4. A magnetic recording medium according to claim 1, wherein the maximum incident angle θmax has a value of 60 to 84 degrees during deposition of the lowermost layer.

5. A magnetic recording medium according to claim 1, wherein the minimum incident angle θmin has a value of 31 to 60 degrees during deposition of the uppermost layer.

6. A magnetic recording medium according to claim 1, wherein the minimum incident angle θmin has a value of 10 to 30 degree during deposition of the lowermost layer.

7. A magnetic recording medium according to claim 1, wherein the minimum incident angle θmin has a value of 31 to 60 degrees and 10 and 30 degrees during deposition of the uppermost and lowermost layers, respectively, and the maximum incident angle θmax has a value of 85 to 90 degrees and 60 to 84 degrees during deposition of the uppermost and lowermost layers, respectively.

8. A magnetic recording medium according to claim 1, wherein the sum of θmax and θmin associated with the uppermost layer is from 100 to 150 degrees, and the sum of θmax and θmin associated with the lowermost layer is from 41 to 139 degrees.

9. A magnetic recording medium according to claim 1 wherein the sum of θmax and θmin associated with the uppermost layer is from 116 to 150 degrees, and the sum of θmax and θmin associated with the lowermost layer is from 70 to 114 degrees.

10. A magnetic recording medium according to claim 1 wherein each of said at least two layers have a thickness of about 400 to 1200 Å.

11. A magnetic recording medium according to claim 10 wherein the lowermost layer of ferromagnetic metal thin film is thicker than the uppermost layer of ferromagnetic metal thin film.

12. A magnetic recording medium according to claim 1 wherein said composite magnetic layer has a thickness of at least 2000 Å.

* * * * *